(12) United States Patent
Hartwich

(10) Patent No.: US 11,943,068 B2
(45) Date of Patent: Mar. 26, 2024

(54) USER STATION FOR A SERIAL BUS SYSTEM AND METHOD FOR ERROR SIGNALING FOR A MESSAGE RECEIVED IN A SERIAL BUS SYSTEM

(71) Applicant: Robert Bosch GmbH, Stuttgart (DE)

(72) Inventor: Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 948 days.

(21) Appl. No.: 16/966,721

(22) PCT Filed: Dec. 18, 2018

(86) PCT No.: PCT/EP2018/085623
§ 371 (c)(1),
(2) Date: Sep. 9, 2020

(87) PCT Pub. No.: WO2019/121763
PCT Pub. Date: Jun. 27, 2019

(65) Prior Publication Data
US 2021/0036813 A1     Feb. 4, 2021

(30) Foreign Application Priority Data
Dec. 22, 2017  (DE) .................. 102017223774.0

(51) Int. Cl.
*H04L 1/18* (2023.01)
*G06F 13/42* (2006.01)
(Continued)

(52) U.S. Cl.
CPC ........ *H04L 1/1896* (2013.01); *G06F 13/4204* (2013.01); *G06F 13/4282* (2013.01);
(Continued)

(58) Field of Classification Search
CPC ..... H04L 1/1896; H04L 1/1848; H04L 1/188; H04L 5/0055; H04L 12/40032; H04L 2001/0094; G06F 13/4204; G06F 13/4282
See application file for complete search history.

(56) References Cited

U.S. PATENT DOCUMENTS

| 9,819,466 B2* | 11/2017 | Yeo ........................ H04L 5/0055 |
| 2018/0254860 A1* | 9/2018 | Wong ..................... H04L 1/1825 |
| 2020/0076546 A1* | 3/2020 | Zhang ................... H04L 1/1861 |

FOREIGN PATENT DOCUMENTS

| CN | 103842981 A | 6/2014 |
| CN | 104364764 A | 2/2015 |

(Continued)

OTHER PUBLICATIONS

Road vehicles Controller area network (CAN) Part 1: Data link layer and physical signalling ; ISO 11898-1:2003, IEEE—SA, Piscataway, NJ USA (2010), pp. 1-52, XP017637056.

(Continued)

*Primary Examiner* — Christine T. Tu
(74) *Attorney, Agent, or Firm* — NORTON ROSE FULBRIGHT US LLP; Gerard A. Messina

(57) ABSTRACT

A user station for a serial bus system and a method for error signaling for a message received in a serial bus system are provided. The user station includes a communication control unit for creating a message to be transmitted serially to at least one further user station of the bus system, or for reading a message, received serially from at least one further user station, and a transceiver device for transmitting the created message on a bus line or for receiving a message from the bus line, the communication control unit and/or the transceiver device provide an ACK time window for an ACK signal and/or a NACK time window for a NACK signal in the message to be transmitted for a signaling of whether or (Continued)

not at least one further user station has identified an error in the transmitted message.

13 Claims, 3 Drawing Sheets

(51) Int. Cl.
*H04L 1/1829* (2023.01)
*H04L 1/1867* (2023.01)
*H04L 5/00* (2006.01)
*H04L 12/40* (2006.01)
*H04L 1/00* (2006.01)

(52) U.S. Cl.
CPC ............ *H04L 1/1848* (2013.01); *H04L 1/188* (2013.01); *H04L 5/0055* (2013.01); *H04L 12/40032* (2013.01); *H04L 2001/0094* (2013.01)

(56) References Cited

FOREIGN PATENT DOCUMENTS

| | | |
|---|---|---|
| CN | 105409175 A | 3/2016 |
| CN | 105634895 A | 6/2016 |
| CN | 107078932 A | 8/2017 |
| CN | 107113209 A | 8/2017 |
| EP | 2521319 A1 | 11/2012 |

OTHER PUBLICATIONS

Road vehicles Controller area network (CAN) Part 2: High-speed medium access unit; ISO 11898-2:2003 (E), IEEE—SA, Piscataway, NJ USA (2010), pp. 1-26, XP017637057.
International Search Report dated Apr. 11, 2019 in connection with PCT/EP2018/085623.

* cited by examiner

USER STATION FOR A SERIAL BUS SYSTEM AND METHOD FOR ERROR SIGNALING FOR A MESSAGE RECEIVED IN A SERIAL BUS SYSTEM

FIELD

The present invention relates to a user station for a serial bus system and to a method for error signaling for a message received in a serial bus system.

BACKGROUND INFORMATION

A communication protocol is used in bus systems for transmitting data between two user stations of the bus. The protocol establishes the pattern according to which the data are combined in packets or in messages to be transmitted. In a serial bus system, different messages and, therefore, also the data, which are encoded in this case in successive bits in the messages, are transmitted in succession via the bus.

To safeguard the correct communication in the bus system, some serial communication protocols include an error identifier such as, for example, a parity bit, a check sum or a CRC (=cyclic redundancy check). With the error identifier, it is possible that the receivers of a message provide the sender feedback whether or not the receivers have identified an error in the received message. In this way, it may be confirmed to the sender that all receivers connected to the serial bus line have received the same state of data. An erroneous message may then be repeated. The aforementioned feedback may be given in a response message or also directly during or at the end of the message transmission.

Different error signalings are introduced for this purpose depending on the serial bus system. For example, the Standard ISO11898-1:2015 defines as CAN protocol specification with CAN FD specific error identifiers or error flags with which a presently transmitted message is interrupted if an error is identified. A positive feedback is also defined at the end of the message, which is also referred to as acknowledge if this message is identified as error-free. The transmission of an error identifier or of an error flag requires a receiver to be able to overwrite the signal driven by the sender on the bus line, so that all bus user stations, including the sender, identify this error flag.

The CAN protocol therefore defines two levels for the bit coding of the message for the transmission on the CAN bus, namely recessive and dominant. In this case, the dominant level overwrites the recessive level. The CAN error flag is made up of six dominant bits. Such a pattern does not occur in an error-free CAN message due to the bit stuffing method, in which a recessive bit is inserted after each five successive dominant bits. Thus, a sequence of six dominant bits in succession is clearly identified as an error identifier or error flag.

The problem is that the bits on the CAN bus are asymmetrically deformed, since the two states of the CAN bus are driven to varying degrees. The flank shift of the bits taking place as a result causes the recessive bits to appear shorter than the adjacent dominant bits. This asymmetry limits the bit rate for the serial transmission, since the recessive bits would be shortened to such a degree at higher bit rates that the recessive bits are no longer able to be reliably identified. In addition, it is provided that an error identifier or error flag is also not reliably identifiable.

SUMMARY

It is an object of the present invention to provide a user station for a serial bus system and a method for error signaling for a message received in a serial bus system, which solves the aforementioned problems. In accordance with example embodiments of the present invention, a user station for a serial bus system and a method for error signaling for a message received in a serial bus system, in particular, are to be provided, in which both an increase of the bit rate for the transmission of messages as well as a reliable error signaling is possible.

The object may be achieved by a user station for a serial bus system including the features of example embodiments of the present invention. In accordance with an example embodiment of The user station includes a communication control unit for creating a message, which is to be transmitted serially to at least one further user station of the bus system, or for reading a message which has been received serially from at least one further user station of the bus system, and a transceiver device for transmitting the created message on a bus line to at least one further user station of the bus system or for receiving a message from the bus line, the communication control unit and/or the transceiver device being designed to provide, in the message to be transmitted, an ACK time window for an ACK signal and/or a NACK time window for a NACK signal for a signaling of whether or not at least one further user station has identified an error in the transmitted message, and the transceiver device being designed not to drive a level on the bus line in the at least one time window provided during transmission to the at least one further user station.

With the user station, it is possible that receivers of a message may be able to report identified errors without using asymmetrical bus levels in the message transmission. As a result, bits in the message may be symmetrically driven on the bus line. This enables higher bit rates in the serial bus system.

The user station also enables a negative acknowledge as error signaling during the serial transmission.

One further advantage results from the fact that the sender need not sample the bus level during the message transmission in order to identify a potential error identifier or error flag. This reduces the effort for the sender, which may also contribute to an increase of the bit rates in the serial bus system.

In accordance with an example embodiment of the present invention, the method carried out by the user station may be subsequently incorporated into a serial communication protocol, in particular, into the CAN protocol specification with CAN FD according to the aforementioned standard. For example, the incorporation is also possible as an option, which may be optionally integrated.

Advantageous further embodiments of the user station are described herein.

According to one exemplary embodiment of the present invention, the communication control unit and/or the transceiver device is/are designed to space the ACK time window for the ACK signal and the NACK time window for the NACK signal apart by a predetermined duration in which no level is driven by the transceiver device.

It is possible to situate the ACK time window in the message temporally before or temporally after the NACK time window.

It is possible that the ACK time window and the NACK time window have the same duration or a different duration.

As a further option of the present invention, the ACK signal is a signal, which is the same for at least two of the user stations of the bus system and/or the NACK signal is a signal, which is the same for at least two of the user stations of the bus system.

According to one further exemplary embodiment of the present invention, the ACK signal and/or the NACK signal include/includes a symbol, which clearly identifies the user station that has transmitted the signal. In this case, it is possible to transmit the NACK signal only on the bus line if the user station has an exclusive, collision-free access to the bus line of the bus system in the NACK time window.

It is possible that the user station is designed for a bus system, in which an exclusive, collision-free access of a user station to a bus line of the bus system is at least temporarily ensured.

The message created or received by the user station may be a CAN message or a CAN FD message.

As a further option, the communication control unit is designed to evaluate the ACK time window for the ACK signal and/or the NACK time window for the NACK signal for a message received from the bus line that has been sent by the user station, and the transceiver device being designed to retransmit the previously transmitted message if the ACK signal and/or the NACK signal signals that an error has been identified.

As yet a further option of the present invention, the communication control unit is designed to evaluate a message received from a further user station of the bus system for errors, the transceiver device being designed to drive an ACK signal in the ACK time window if the communication control unit has identified no error in the received message or to drive a NACK signal in the NACK time window if the communication control unit has identified an error in the received message.

The above-described user station may be part of a bus system, which also includes a parallel bus line and at least two user stations, which are interconnected via the bus line in such a way that they are able to communicate with one another. In this case, at least one of the at least two user stations is an above-described user station.

The aforementioned object may also be achieved by a method for error signaling for a message received in a serial bus system in accordance with an example embodiment of the present invention. The example method has the steps: creating, using a user station of the bus system, a message, which is to be transmitted serially to one further user station of the bus system, and transmitting the created message via a bus line to at least one further user station of the bus system, an ACK time window for an ACK signal and/or a NACK time window for a NACk signal being provided for a signaling in the transmitted message, whether or not at least one further user station has identified an error in the transmitted message, in the step of transmitting the created message, no level being driven on the bus line by the user station in the at least one time window provided.

The aforementioned object may also be achieved by a method for error signaling for a message received in a serial bus system in accordance with the present invention. In an example embodiment of the present invention, the method has the steps: reading, using a user station of the bus system, a message, which has been received serially via a bus line from at least one further user station of the bus system, and which includes an ACK time window for an ACK signal and/or a NACK time window for a NACK signal for a signaling whether or not the at least one further user station has identified an error in the transmitted message, and evaluating, using the user station, the read message for errors, driving an ACK signal in the ACK time window if no error has been identified in the received message and/or driving a NACK signal in the NACK time window if an error has been identified in the received message.

The above-described methods offer the same advantages as mentioned above with respect to the user station.

One further advantageous embodiment of the above-described method is that during the ongoing operation of the bus system, a switching takes place between operating modes of multiple operating modes, which include the following operating modes: an operating mode A), in which a signal, which is the same for at least two of the user stations of the bus system, is transmitted as the ACK signal, and/or a signal, which is the same for at least two of the user stations of the bus system, is transmitted as the NACK signal, an operating mode B), in which the ACK signal and/or the NACK signal include/includes a symbol, which clearly identifies the user station that has transmitted the signal, and an operating mode C), in which the NACK signal is only transmitted on the bus line if the user station has an exclusive, collision-free access to the bus line of the bus system in the NACK time window.

Further possible implementations of the present invention also include combinations not explicitly mentioned of features and specific embodiments described above or below with respect to the exemplary embodiments. In this case, those skilled in the art will also add individual aspects as improvements on or additions to the respective basic form of the present invention, in view of the present disclosure.

BRIEF DESCRIPTION OF THE DRAWINGS

The present invention is described in greater detail below with reference to the figures and based on exemplary embodiments.

In the figures, identical or functionally identical elements are provided with the same reference numeral unless otherwise indicated.

DETAILED DESCRIPTION OF EXAMPLE EMBODIMENTS

Figure 1:
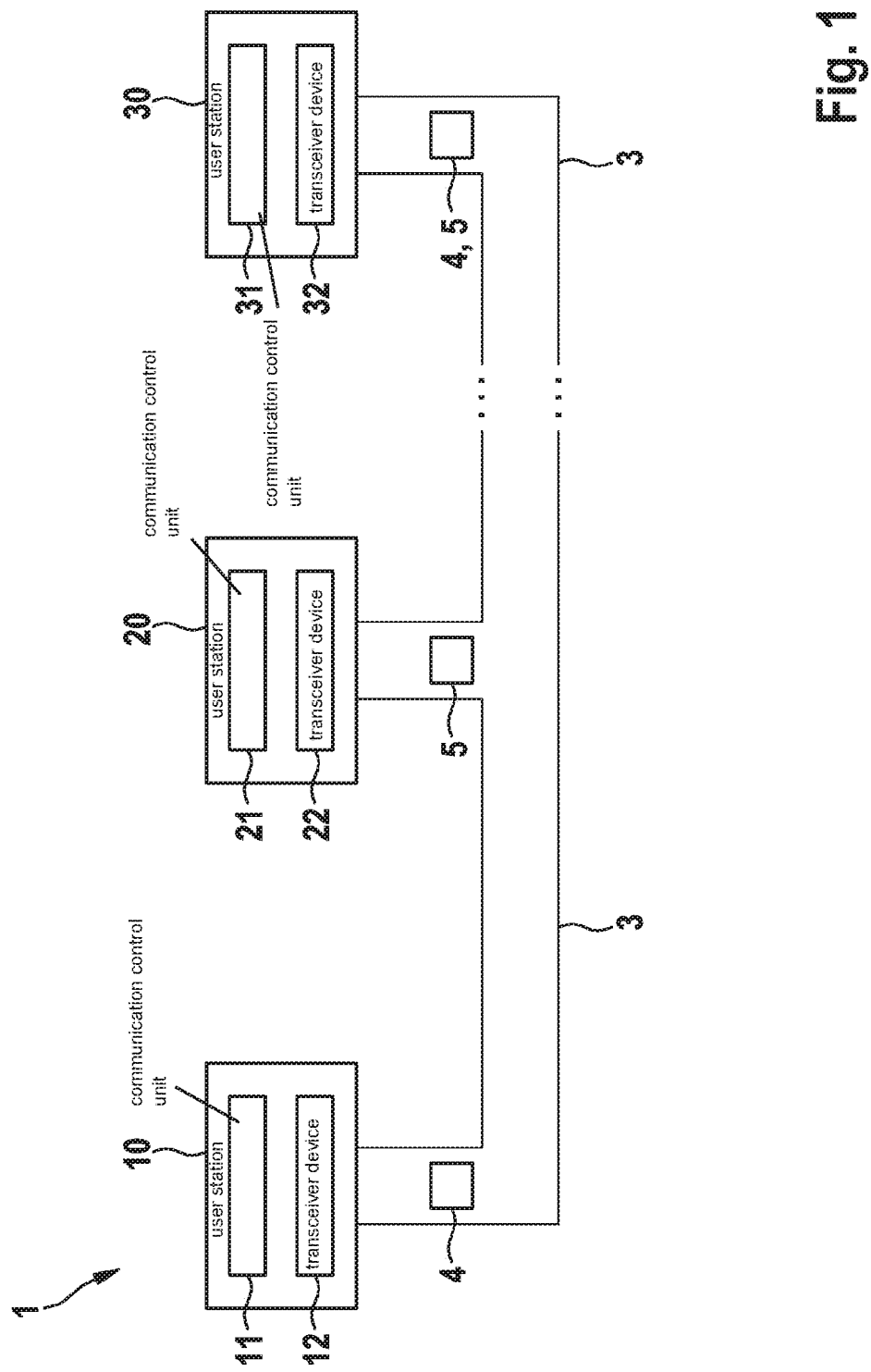
FIG. 1 shows a simplified block diagram of a bus system according to a first exemplary embodiment of the present invention.

FIG. 1 shows as an example a serial bus system 1, which may be designed as an arbitrary serial bus system, in which an error signaling for received messages takes place. Bus system 1 is, in particular, a CAN bus system, a CAN FD bus system, a FlexRay bus system, a bus system for Ethernet, a Gigabit-Ethernet, etc. Bus system 1 is usable in a motor vehicle, in an aircraft, etc., or in a hospital, etc.

Bus system 1 in FIG. 1 has, in particular, a parallel bus line 3 designed as a two-wire line, to which a plurality of user stations 10, 20, 30 are connected. Messages 4, 5 in the form of signals are transmittable serially via bus line 3 between individual user stations 10, 20, 30. User stations 10, 20, 30 are arbitrary devices intended to exchange data serially with one another such as, for example, control units, sensors, display devices, etc., of a motor vehicle. Alternatively, user stations 10, 20, 30 are, for example, computers of a computer network or components of an automation network for an industrial facility. User stations 10, 20, 30 are, however, not limited to the aforementioned specific examples.

The present invention is described below by way of example based on the CAN bus system and CAN FD bus system. However, the present invention is not limited thereto, rather, the present invention may be applied to an arbitrary serial bus system.

As shown in FIG. 1, user station 10 has a communication control unit 11 and a transceiver device 12. In contrast, user station 20 has a communication control unit 21 and a transceiver device 22. User station 30 has a communication control unit 31 and a transceiver device 32. Transceiver devices 12, 22, 32 of user stations 10, 20, 30 are each directly connected to bus line 3, even though this is not illustrated in FIG. 1.

Communication control unit 11, 21, 31 each serve to control a communication of respective user station 10, 20, 30 via bus line 3 with a different user station of user stations 10, 20, 30, which are connected to bus line 3.

Communication control unit 11, for the example of the CAN bus system, may be designed as a conventional CAN controller except for the differences described in greater detail below. In this case, communication control unit 11 creates and reads first messages 4, for example, modified classic CAN messages 4. Classic CAN messages 4 are structured according to the classic basic format except for the modifications described below, in which a number of up to 8 data bytes may be encompassed in message 4 as shown in the upper part of FIG. 2.

Communication control unit 21 in FIG. 1 may, for the example of the CAN bus system, be designed as a conventional CAN FD controller except for the differences described in greater detail below. In this case, communication control unit 21 creates and reads second messages 5, which are modified CAN FD messages 5, for example. In this case, the modified CAN FD messages 5 are structured on the basis of a CAN FD format except for the modifications described below, in which a number of up to, for example, 64 data bytes may be encompassed in message 5, as shown in the lower part of FIG. 2.

Communication control unit 31 may, for the example of the CAN bus system, be designed in order, as needed, to provide to or to receive from transceiver device 32 a modified classic CAN message 4 or a modified classic CAN FD message 5. Thus, communication control unit 21 creates and reads a first message 4 or second message 5, first and second message 4, 5 differing in terms of their data transmission standard, namely, in this case modified CAN or modified CAN FD.

Transceiver device 12 may thus be designed as a conventional CAN transceiver except for the differences described in greater detail below. Transceiver device 22 may be designed as a conventional CAN FD transceiver except for the differences described in greater detail below. Transceiver device 32 may be designed in order, as needed, to provide for or to receive from communication control unit 31 messages 4 according to the modified CAN base format or messages 5 according to the modified CAN FD format.

A formation and then transmission of messages 5 with the modified CAN FD or also with data rates higher than CAN FD are implementable with the two user stations 20, 30.

Figure 2:
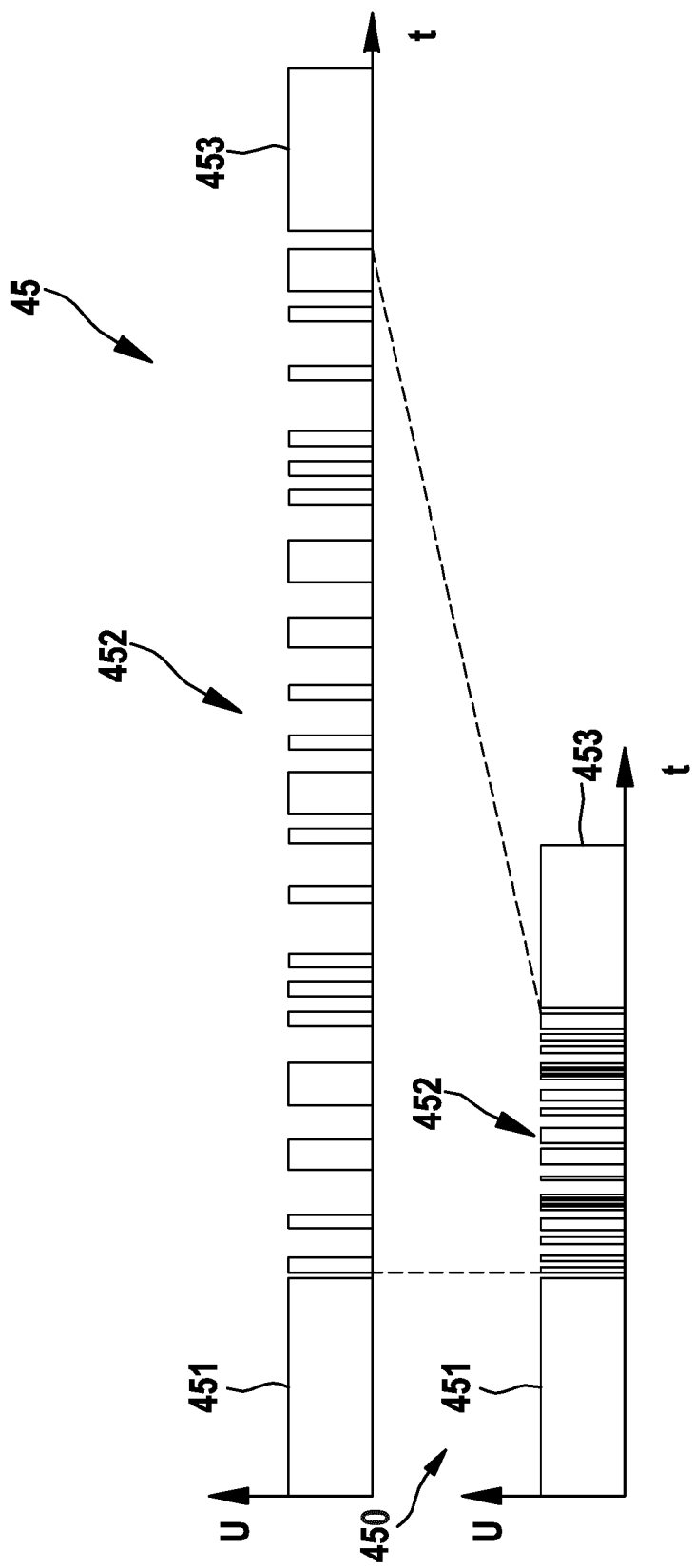
FIG. 2 shows a diagram for illustrating the structure of messages, which may be transmitted by user stations of the bus system according to the first exemplary embodiment of the present invention.

The upper part of FIG. 2 shows for message 4 a CAN frame 45 as it is transmitted by transceiver device 12 or transceiver device 13, and in its lower part for message 5 a CAN FD frame 450 as it may be transmitted by transceiver device 22 or 32. CAN frame 45 and CAN FD frame 450 are subdivided basically into two different phases or areas for the CAN communication on bus 40, namely arbitration phases 451, 453 and a data area 452, which is also referred to as data field in classic or classic CAN or also as data phase 452 in CAN FD. The payload data of the CAN FD frame or of message 5 are contained in data phase 452.

According to FIG. 2, the bit rate for following data phase 452 is increased, for example, to 2, 4, 8 Mbps at the end of arbitration phase 451 in CAN FD as compared to the classic CAN. This means that in CAN FD, the bit rate in arbitration phases 451, 453 is lower than the bit rate in data phase 452. In CAN FD, data phase 452 of CAN FD frame 450 is temporally significantly reduced compared to data phase 452 of CAN frame 45.

In a serial bus system without arbitration 451, 453 such as, for example, Ethernet, FlexRay, etc., two data phases 452 follow in direct succession.

Figure 3:
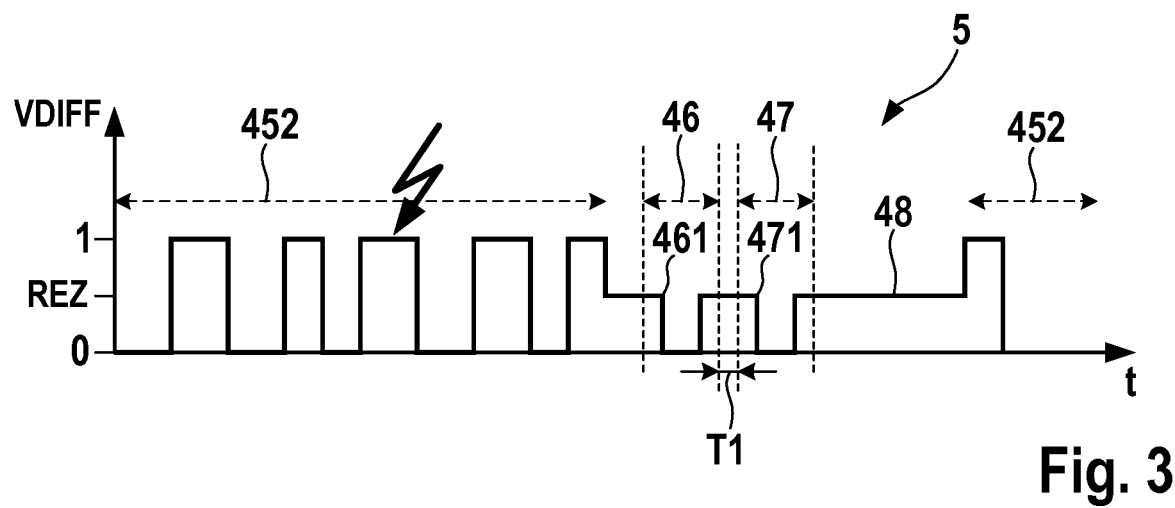
FIG. 3 shows a representation of an example of a temporal profile of a differential voltage VDIFF of bus signals CAN_H, CAN_L for a part of the message in a transceiver device of the bus system according to the first exemplary embodiment of the present invention.

FIG. 3 illustrates the end of a data phase 452 as an example of a message 5 based on a differential voltage VDIFF over time t. For a message 4, the following embodiments are equally applicable.

Message 5 is generated with differential symmetrical bus levels via a two-wire bus line as bus line 3. The recessive bus level, which is referred to as logic '1' in FIG. 3, is not driven by bus user stations 10, 20, 30, but is determined by a terminal resistance of bus line 3. The dominant bus level is depicted in FIG. 3 as logic '0'.

According to FIG. 3, an ACK time window 46 for an ACK signal 461 and a NACK time window 47 for a NACK signal 471 follow after data phase 452. Thereafter follows a sequence of recessive levels REZ, which indicates the end of the transmission of a frame of message 5 and is identified in FIG. 3 by reference numeral 48. As an example, an error in data phase 452 is depicted in FIG. 3 which, in this example, is seen by at least one but not by all receivers, as a black jagged block arrow.

Thus, in the example in FIG. 3, both an ACK signal 461 as well as a NACK signal is transmitted, namely ACK signal 461 by the receivers, which have seen no error, and NACK signal 471 by those which have seen an error.

In the time period between the two data phases 452 in FIG. 3, the sender of message 5 does not drive the bus or the voltage level on bus line 3 at all. If the bus is also not driven in this time period by any other of user stations 10, 20, 30 in bus system 1, a level REZ, which is between the levels for logic '1' and logic '0' in FIG. 3 arises on bus line 3 between the end of data phase 452 and the beginning of ACK time window 46, as shown in FIG. 3.

Since the method described herein is not tied to a particular message format for the serial transmission, a case is depicted in FIG. 3 in which two data phases 452 follow in succession.

Unlike the representation in FIG. 3, next message 5 may alternatively begin with an arbitration as described above with respect to the CAN protocol. In the CAN protocol, one of the two driven bus levels is replaced by a recessive level and differential voltage VDIFF results for differential signals CAN_H and CAN_L over time t. As exemplified by the CAN protocol, ACK time window 46 would be the ACK slot or the ACK field after the CRC field.

Regardless of selected serial bus system 1, it is the case that ACK time window 46 and transmitted ACK signal 461 have defined lengths, transmitted ACK signal 461 not being longer than ACK time window 46, as is represented in FIG. 3. By superposing ACK signals 461 of multiple user stations 10, 20, 30, it is possible to lengthen resulting ACK signal 461 on the bus. The lengths of ACK time window 46 and ACK signal 461, as well as the permitted tolerances for identifying a valid ACK signal 461 by the sender are selected appropriate to the bit rate in such a way that potential phase shifts between user stations 10, 20, 30 do not distort ACK signal 461. As a result, it is not necessary for the receivers of message 5 to check ACK signal 461.

A duration T1, in which the bus is not driven by any of user stations 10, 20, 30, is situated between ACK time window 46 and NACK time window 47. As a result, level REZ arises between time windows 46, 47 on bus line 3.

NACK time window 47 and transmitted NACK signal 471 also have defined lengths, transmitted NACK signal 471 not being longer than NACK time window 47, as represented in FIG. 3. By superposing NACK signals 471 of multiple user stations 10, 20, 30, it is possible to lengthen resulting NACK signal 471 on the bus. The lengths of NACK time window 47 and NACK signal 471 as well as the permitted tolerances for identifying a valid NACK signal 471 by the sender are selected appropriate to the bit rate in such a way that potential phase shifts between user stations 10, 20, 30 do not distort NACK signal 471. As a result, it is not necessary for the receivers of message 5 to check ACK signal 471.

As mentioned above, a sender of message 5, for example, user station 20, does not drive the bus or the voltage on bus line 3 during ACK time window 46 at all. This bus level, which is not driven by a bus user station 10, 30, 30 present in the bus, is referred to here as recessive, because it is able to be overwritten by one of the driven bus levels. The same applies to NACK time window 47.

The receivers that have seen an error-free message 5 of user station 20 as the sender of message 5, i.e., in this case, for example, user station 30, drive an established bus level, for example, a '0', as ACK signal 461 in ACK time window 46, as shown in FIG. 3. The receivers, which have identified an error in message 5, i.e., in this case, for example, user station 10, do not drive the bus or the level on bus line 3 in ACK time window 46 at all.

The receivers that have seen an error in message 5 drive an established bus level, for example, a '0' as NACK signal 471 in NACK time window 47, as shown in FIG. 3. The receivers that have identified no error in message 5 do not drive the bus or the level on bus line 3 in NACK time window 47 at all.

If the sender of the message sees an ACK signal 461 and no NACK signal 471, message 5 is successfully conveyed to all active bus users of user stations 10, 20, 30.

If the sender sees a NACK signal 471 and no ACK signal 461, none of the active bus users has received message 5.

If the sender sees or receives both signals 461, 471, at least one of the active bus users has received message 5, but at least one other of the active bus users has rejected this message 5 due to local errors.

If the sender sees neither an ACK signal 461 nor a NACK signal 471, it is the only active user station 10, 20, 30 in bus system 1.

According to one modification of the first exemplary embodiment, NACK time window 47 is used in order to identify user stations 10, 20, 30 that have seen an error in message 5. For this purpose, each user station 10, 20, 30 of bus system 1 is assigned a clearly identifiable NACK symbol. With up to 31 user stations 10, 20, 30 in bus system 1, it is possible to issue, for example, a five-digit bit sequence as a NACK symbol. The bits of the bit sequence may be coded similarly to the CAN arbitration, in particular, the logic '1' as a recessive bus level and the logic '0' as the driven bus level. In order to be able to identify the error messages of individual user stations 10, 20, 30, the method may be applied in multiple stages as described below with respect to operating mode C).

In such a modification of the first exemplary embodiment, it is possible to switch the method during the ongoing operation between at least two of the subsequently mentioned operating modes. This means, at least two of the operating modes subsequently mentioned may optionally be implemented in user stations 10, 20, 30 of bus system 1.

Operating mode A): all NACK senders transmit only one simple NACK signal 471, which allows for no possibility of identifying the individual NACK senders.

Operating mode B): the NACK senders transmit their identifiable NACK symbols. If more than one user station 10, 20, 30 transmits a NACK symbol, the NACK symbols of user stations 10, 20, 30 overlap and are no longer clearly identifiable. The sender of message 5 recognizes only that at least one user station 10, 20, 30 of bus system 1 has seen an error, as in the case of operating mode A). Operating mode B) may, however, be used for analyzing sporadic individual errors if, in general, only one user station 10, 20, 30 of bus system 1 sees an error in message 5.

Operating mode C): the NACK symbol senders arbitrate among each other according to the rules of CAN arbitration. The losers of the arbitration terminate their NACK symbol in this NACK time window 47. After the first NACK time window 47, in which a NACK symbol has been transmitted, a second NACK time window 47 is started. Here, the losers of the arbitration of the first NACK time window 47 restart their NACK symbols. This is repeated until an established upper limit of NACK time windows 47 is reached, or until a NACK time window 47 has remained empty. Thus, a user station 10, 20, 30 of bus system 1 per NACK time window 47 is identified, which has seen an error in message 5.

Operating mode C) is primarily helpful for an error search and/or an error analysis, if a search is to be made for the cause of sporadic errors. In this case, a NACK symbol may be used in order to simply ascertain also in a CAN network user station 10, 20, 30, that has transmitted an error identifier (error flag). The established upper limit of NACK time windows 47 results from the fact that in a NACK time window 47 only one NACK system is decoded and thus when a NACK symbol has been seen, an additional NACK time window 47 is always appended. This demands considerable bus bandwidth, so that the upper limit establishes how much bandwidth may be provided for the error search.

An alternation between at least two of the three operating modes A), B), C) may take place depending on the requirements of bus system 1. The alternation of operating modes A) or B) or C) may either be centrally controlled, for example, by one of user stations 10, 20, 30 or may be controlled by an algorithm and in this way take place, in particular, as a function of the error frequency.

In the example methods, the end of the transmission is identified by a sufficiently long recessive level as sequence 48 which, in the case of CAN, for example, is called, "end of frame". The threshold value for the end-of-frame length or length of sequence 48 is a function of the bit rate and of the lengths of ACK and NACK time windows 46, 47.

In the example described herein, the non-driven recessive bus level is overwritten with the driven level for logic '0'. According to one modification, the driven level may instead be used for logic '1'.

According to one further modification of the present invention, it is possible for ACK signals 461 and the associated ACK symbol to use a bus level other than that used for NACK signals 471 and the associated NACK symbol.

According to one further modification of the above-described exemplary embodiments, it is possible to use the method described for operating mode C) for identifiable NACK symbols in addition or alternatively for identifiable ACK symbols.

According to still one further modification of the above-described exemplary embodiments of the present invention, it is possible to limit the transmitting of ACK symbols to the user stations of bus system 1, for which the instantaneous message 5, 50, 500 is intended.

According to still one further modification of the above-described exemplary embodiments of the present invention, it is possible to forego NACK symbols when identifiable ACK symbols are used.

Figure 4:
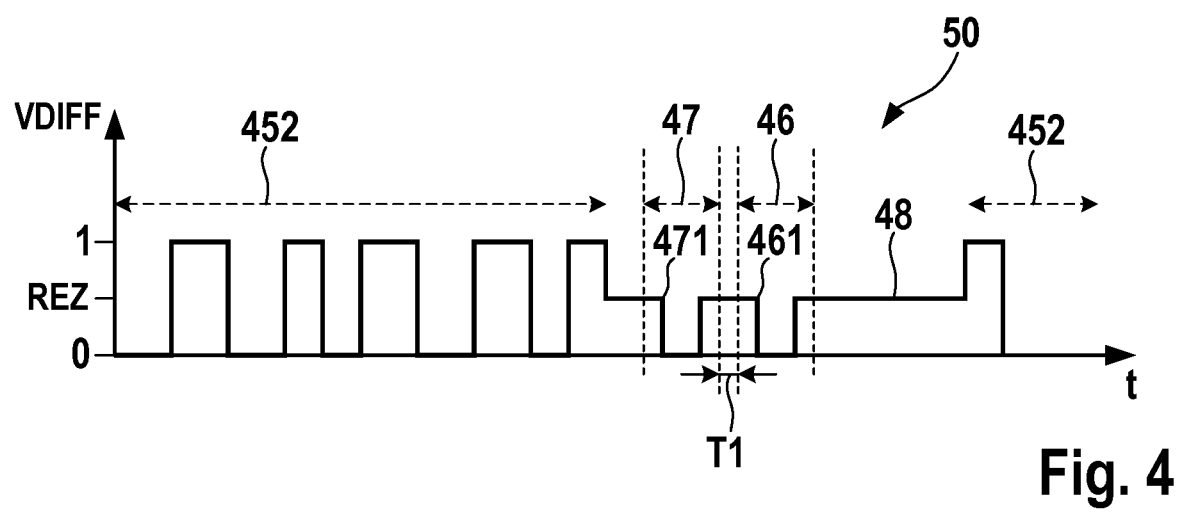
FIG. 4 shows a representation of an example of a temporal profile of a differential voltage VDIFF of bus signals CAN_H and CAN_L for a part of a message in a transceiver device of a bus system according to a second exemplary embodiment of the present invention.

FIG. 4 shows with respect to a second exemplary embodiment of the present invention, the area at the end of data phase 452 for a message 50. Here too, differential voltage VDIFF is again shown over time t with differential symmetrical bus levels via a two-wire bus line as bus line 3, as already described above with reference to FIG. 3.

In contrast to FIG. 3, NACK time window 47 comes before ACK time window 46 in the second exemplary embodiment according to FIG. 4.

Otherwise, the same applies as above-described in conjunction with FIG. 3.

Figure 5:
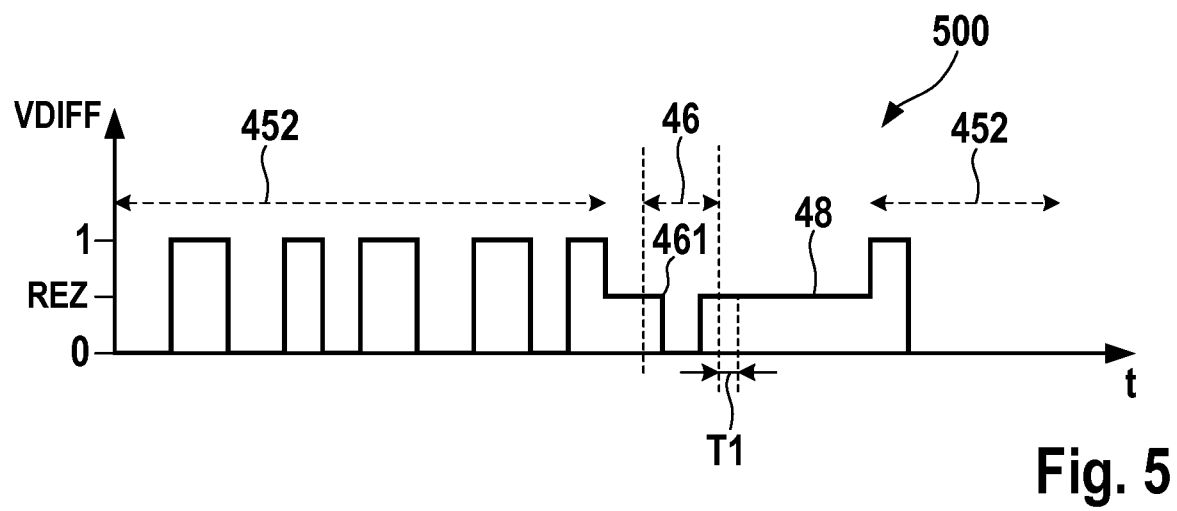
FIG. 5 shows a representation of an example for a temporal profile of a differential voltage VDIFF of bus signals CAN_H and CAN_L for a part of a message in a transceiver device of a bus system according to a third exemplary embodiment of the present invention.

FIG. 5 shows with respect to a third exemplary embodiment of the present invention, the area at the end of data phase 452 for a message 500. Here too, differential voltage VDIFF is again shown over time t with differential symmetrical bus levels via a two-wire bus line as bus line 3, as already described above with reference to FIG. 3.

In contrast to FIG. 3 and FIG. 4, only one of time windows 46, 47 is present in the third exemplary embodiment of the present invention. This is shown as an example in FIG. 5, only ACK time window 46 being present. Alternatively, it is also possible, however, that only NACK time window 47 is present.

Otherwise, the same applies as described above in conjunction with FIG. 3.

On the whole, it is possible with the above-described exemplary embodiments including all their embodiment variants or modifications to achieve an improved error signaling for received messages 5, 50 500 for the sender in bus system 1.

All of the above-described embodiments of bus system 1, of user stations 10, 20, 30 and of the method carried out by the latter may be used individually or in all possible combinations. All features of the above-described exemplary embodiments and/or their embodiment variants and/or their modifications may, in particular, be arbitrarily combined. In addition or alternatively, the following modifications, in particular, are possible.

The above-described bus system 1 according to the exemplary embodiments is described with reference to a bus system based on the CAN protocol. Bus system 1 according to the exemplary embodiments may, however, also be another type of serial communication network. It is advantageous, but not a necessary precondition, that in bus system 1 an exclusive collision-free access of a user station 10, 20, 30 to a shared channel is ensured for particular time spans.

The number and configuration of user stations 10, 20, 30 in bus system 1 of the exemplary embodiments is arbitrary. User station 10, in particular, may be omitted in bus system 1. It is possible that one or multiple of user stations 10 or 20 or 30 are present in bus system 1.

What is claimed is:

1. A user station for a serial bus system having user stations, comprising:
   a communication control unit configured to create a message which is to be transmitted serially to a first at least one further user station of the bus system, or to read a message which has been received serially from a second at least one further user station of the bus system; and
   a transceiver device configured to transmit the created message on a bus line to the first at least one further user station of the bus system or to receive a message from the bus line;
   wherein the communication control unit and/or the transceiver device is configured to provide, in the created message to be transmitted, an ACK time window for an ACK signal and/or a NACK time window for a NACK signal for a signaling of whether or not the first at least one further user station has identified an error in the transmitted message, and the transceiver device is configured not to drive any level on bus line in the at least one provided time window during the transmission to the first at least one further user station, such that a recessive bus level arises with a value between a first bus level value and a second bus level value.

2. The user station as recited in claim 1, wherein the communication control unit and/or the transceiver device is configured to space the ACK time window for the ACK signal and the NACK time window for the NACK signal apart by a predefined duration in which the bus line is exhibiting the recessive bus level.

3. The user station as recited in claim 1, wherein the ACK time window is situated temporally before or temporally after the NACK time window in the message.

4. The user station as recited in claim 1, wherein the ACK time window and the NACK time window have the same or a different duration.

5. The user station as recited in claim 1, wherein:
   a first instance of the ACK signal and a second instance of the ACK signal are the same as each other for at least two of the user stations of the bus system, and/or
   a first instance of the NACK signal and a second instance of the NACK signal are the same as each other for at least two of the user stations of the bus system.

6. The user station as recited in claim 1, wherein the ACK signal and/or the NACK signal includes a symbol which identifies a particular one of the user stations that has transmitted the ACK signal and/or the NACK signal.

7. The user station as recited in claim 6, wherein the user station is configured to transmit the NACK signal on the bus line only when the user station has an exclusive, collision-free access to the bus line of the bus system in the NACK time window.

8. The user station as recited in claim 1, wherein the transmitted message is a CAN message or a CAN FD message.

9. The user station as recited in claim 1, wherein the communication control unit is configured to evaluate the ACK time window for the ACK signal and/or the NACK time window for the NACK signal for a message transmitted by the user station and received from a bus line, and the transceiver device is configured to retransmit the previously transmitted message when the ACK signal and/or the NACK signal signals that an error has been identified.

10. The user station as recited in claim 1, wherein the communication control unit is designed to evaluate the message received from the second a further user station of the bus system for errors, and the transceiver device is configured to drive an ACK signal in an ACK time window of the received message when the communication control unit has identified no error in the received message or to drive a NACK signal in a NACK time window of the received message when the communication control unit has identified an error in the received message.

11. A bus system, comprising:
a bus line; and
at least two user stations which are interconnected via the bus line in such a way that the at least two user stations are able to communicate with one another;
wherein at least one of the at least two user stations is a user station including:
  a communication control unit configured to create a message which is to be transmitted serially to a first at least one further user station of the bus system, or to read a message which has been received serially from a second at least one further user station of the bus system; and
  a transceiver device configured to transmit the created message on a bus line to the first at least one further user station of the bus system or to receiving a message from the bus line;
  wherein the communication control unit and/or the transceiver device is configured to provide, in the created message to be transmitted, an ACK time window for an ACK signal and/or a NACK time window for a NACK signal for a signaling of whether or not the first at least one further user station has identified an error in the transmitted message, and the transceiver device is configured not to drive any level on bus line in the at least one provided time window during the transmission to the first at least one further user station, such that a recessive bus level arises with a value between a first bus level value and a second bus level value.

12. A method for error signaling for a message received in a serial bus system, the method comprising the following steps:
creating, using a user station of the bus system, a message which is to be transmitted serially to at least one further user station of the bus system; and
transmitting the created message via a bus line to at least one further user station of the bus system, an ACK time window for an ACK signal and/or a NACK time window for a NACK signal being provided in the transmitted message for a signaling of whether or not at least one further user station has identified an error in the received message;
wherein, in the step of transmitting the created message, no level is driven on the bus line by the user station in the ACK time window and/or the NACK time window, such that a recessive bus level arises with a value between a first bus level value and a second bus level value.

13. A method for error signaling for a message received in a serial bus system, the method comprising the following steps:
reading, using a user station of the bus system, a message which has been received serially from at least one further the user station of the bus system via a bus line, and which includes an ACK time window for an ACK signal and/or a NACK time window for a NACK signal for a signaling of whether or not the user station has identified an error in the transmitted message; and
evaluating, using the user station, the read message for errors; and
driving an ACK signal in the ACK time window when no error has been identified in the received message, or driving a NACK signal in the NACK time window when an error has been identified in the received message.

* * * * *